United States Patent
Chen et al.

(10) Patent No.: US 8,964,158 B2
(45) Date of Patent: Feb. 24, 2015

(54) LIQUID CRYSTAL DISPLAY DEVICE

(71) Applicant: Innolux Corporation, Chu-Nan, Miao-Li County (TW)

(72) Inventors: Ming-Hung Chen, Chu-Nan (TW); Ying-Jen Chen, Chu-Nan (TW); Chih-Yung Hsieh, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 157 days.

(21) Appl. No.: 13/846,483

(22) Filed: Mar. 18, 2013

(65) Prior Publication Data
US 2013/0250216 A1 Sep. 26, 2013

(30) Foreign Application Priority Data

Mar. 21, 2012 (TW) .............................. 101109606 A

(51) Int. Cl.
G02F 1/1343 (2006.01)
G02F 1/1335 (2006.01)
G02F 1/1337 (2006.01)

(52) U.S. Cl.
CPC .... *G02F 1/134309* (2013.01); *G02F 1/133707* (2013.01); *G02F 1/134336* (2013.01); *G02F 2001/134318* (2013.01)
USPC .............. 349/146; 349/96; 349/129; 349/130

(58) Field of Classification Search
CPC ..................... G02F 1/133536; G02F 1/133707; G02F 1/1393; G02F 1/133753; G02F 2001/133742; G02F 1/134336; G02B 5/3033
USPC ..................................... 349/96, 146, 129, 130
See application file for complete search history.

(56) References Cited

U.S. PATENT DOCUMENTS

2006/0164585 A1* 7/2006 Shih .............................. 349/144
2008/0111963 A1* 5/2008 Wu et al. ....................... 349/144

FOREIGN PATENT DOCUMENTS

| JP | 2007-102073 A | 4/2007 |
|---|---|---|
| TW | 200604642 A | 2/2006 |
| TW | 200912451 A | 3/2009 |

* cited by examiner

Primary Examiner — Mike Qi
(74) Attorney, Agent, or Firm — Liu & Liu

(57) ABSTRACT

A liquid crystal (LC) display device includes a first substrate having a pixel unit and a second substrate. The pixel unit has a pixel electrode unit including a primary electrode region. A LC layer with chiral dopants is disposed between the first and second substrates. The pixel unit has a first boundary along a horizontal direction of an upper portion of the pixel unit. The first boundary has a first central point. The primary electrode region has a first side along the horizontal direction of an upper portion of the primary electrode region. The first side has a second central point left to the first central point. The primary electrode region has a second side located on the left to the second central point, and a first angle between the first and second sides is larger than 90 degrees or equal to 90 degrees.

20 Claims, 14 Drawing Sheets

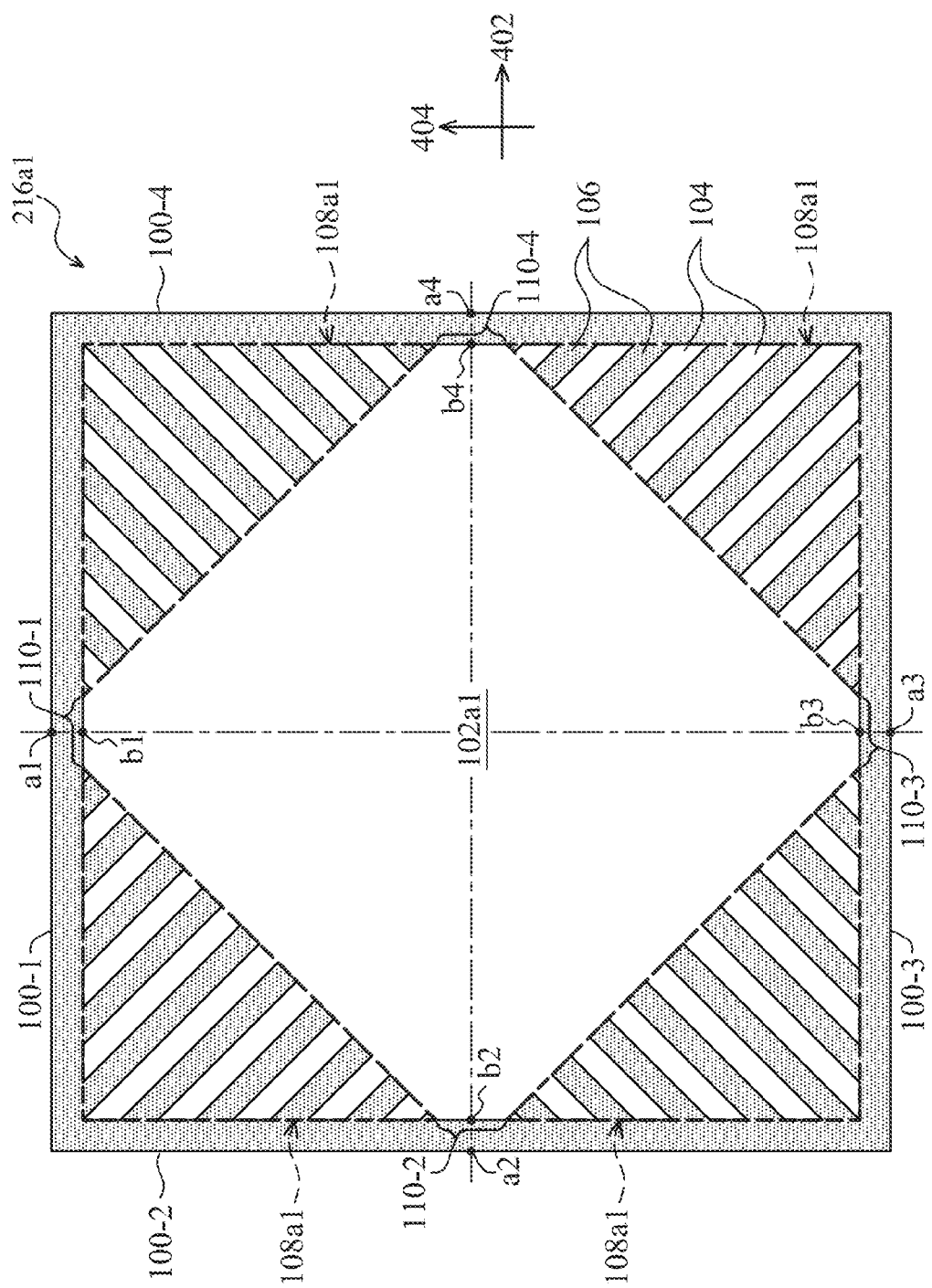

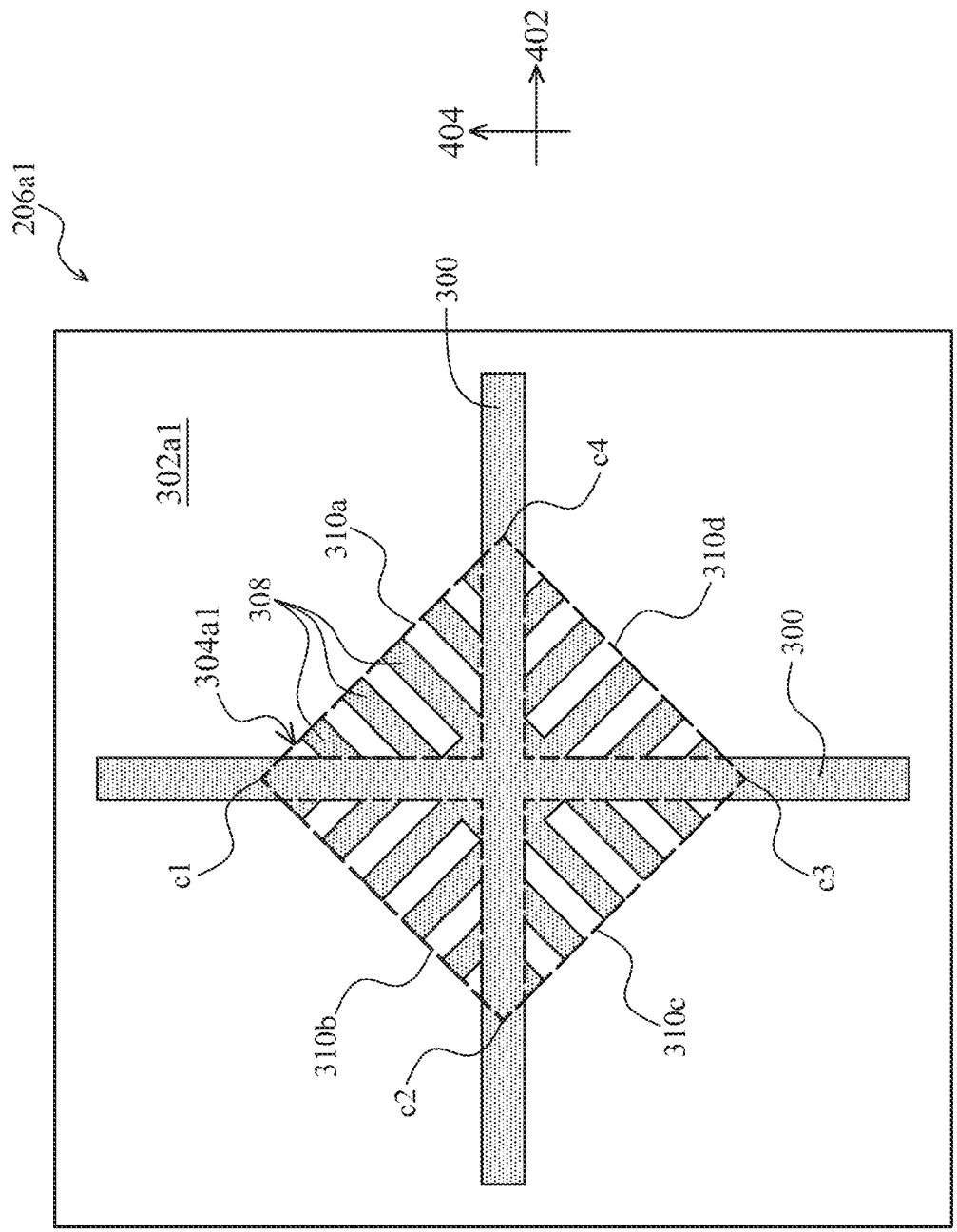

LIQUID CRYSTAL DISPLAY DEVICE

CROSS REFERENCE TO RELATED APPLICATIONS

This application claims priority of Taiwan Patent Application No. 101109606, filed on Mar. 21, 2012, the entirety of which is incorporated by reference herein.

BACKGROUND OF THE INVENTION

1. Field of the Invention

The present invention relates to a liquid crystal display device, and in particular, to design of electrodes of a liquid crystal display device.

2. Description of the Related Art

The transmittance of a liquid crystal (LC) display device can be modified due to different polarizations or diffractions of an incident light by changing the arrangements of liquid crystal molecules, so that the LC display can produce images. The conventional twisted nematic (TN) device has a good transmittance performance. However, the conventional TN device has a very narrow viewing-angle, which is limited by the structure and optical characteristics of the liquid crystal molecules. Therefore, it is a challenge for the LC display to have both a wide-viewing-angle and high utilization of light characteristics.

A vertical alignment (VA) type wide-viewing-angle LC display has been developed to solve the aforementioned problems. The VA type LC display comprises a patterned vertical alignment (PVA) type LC display, a multi-domain vertical alignment (MVA) type LC display, and etc. The PVA type LC display achieves the goal of wide-viewing-angle characteristics by applying a fringing-field effect thereto and optical compensation films. The MVA type LC display widens the viewing-angle and improves transmittance of the LC display by dividing a pixel area into multi domains and tilting liquid crystals respectively in the multi domains in several different directions using protrusion features or specific indium tin oxide (ITO) patterns (electrode patterns).

However, design of the electrode patterns are required to match the chirality of the liquid crystal (LC) molecules. If the design of the electrode patterns can not match the chirality of the liquid crystal (LC) molecules, a distribution area of the optical dark lines, which result from the non-tilting or tilting error problems of the LC molecules, would increase, thereby reducing the transmittance of the LC display.

Thus, a novel liquid crystal display device with improved transmittance characteristics is desired.

BRIEF SUMMARY OF INVENTION

A liquid crystal display is provided. An exemplary embodiment of a liquid crystal display device comprises a first substrate having a pixel unit, wherein the pixel unit has a pixel electrode unit, and wherein the pixel electrode unit comprises a primary electrode region and a slit region. A first boundary, along a horizontal direction of an upper portion of the pixel unit, has a first central point. A second substrate is disposed opposite to the first substrate, and has an opposite electrode unit. A first polarizer is disposed under the first substrate. A second polarizer is disposed abovethe second substrate, wherein a polarization axis of the second polarizer is vertical to that of the first polarizer. A liquid crystal (LC) layer with chiral dopants is disposed between the first and second substrates. The pixel unit has a first boundary along a horizontal direction of an upper portion of the pixel unit. The first boundary has a first central pointt. The primary electrode region has a first side along the horizontal direction of an upper portion of the primary electrode region. The first side has a second central point left to the first central pointt. The primary electrode region has a second side located on the left to the second central point, and a first angle between the first and second sides in the primary electrode region is larger than 90 degrees or equal to 90 degrees.

Another exemplary embodiment of a liquid crystal display device comprises a first substrate having a pixel unit, wherein the pixel unit has a pixel electrode unit. A second substrate is disposed opposite to the first substrate, and has an opposite electrode unit, wherein the opposite electrode unit comprises a cross primary slit dividing the opposite electrode unit into four quadrants, wherein the shape of a sub-slit region in at least one of the quadrants is a trapezoid shape. A first polarizer is disposed under the first substrate. A second polarizer is disposed above the second substrate, wherein a polarization axis of the second polarizer is vertical to that of the first polarizer. A liquid crystal (LC) layer with chiral dopants is disposed between the first and second substrates.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4a illustrates a top view of one comparable embodiment of a pixel electrode unit of a liquid crystal display device.

FIGS. 4d-4e illustrate top views of comparable embodiments of an opposite electrode unit of a liquid crystal display device.

DETAILED DESCRIPTION OF INVENTION

Figure 1:
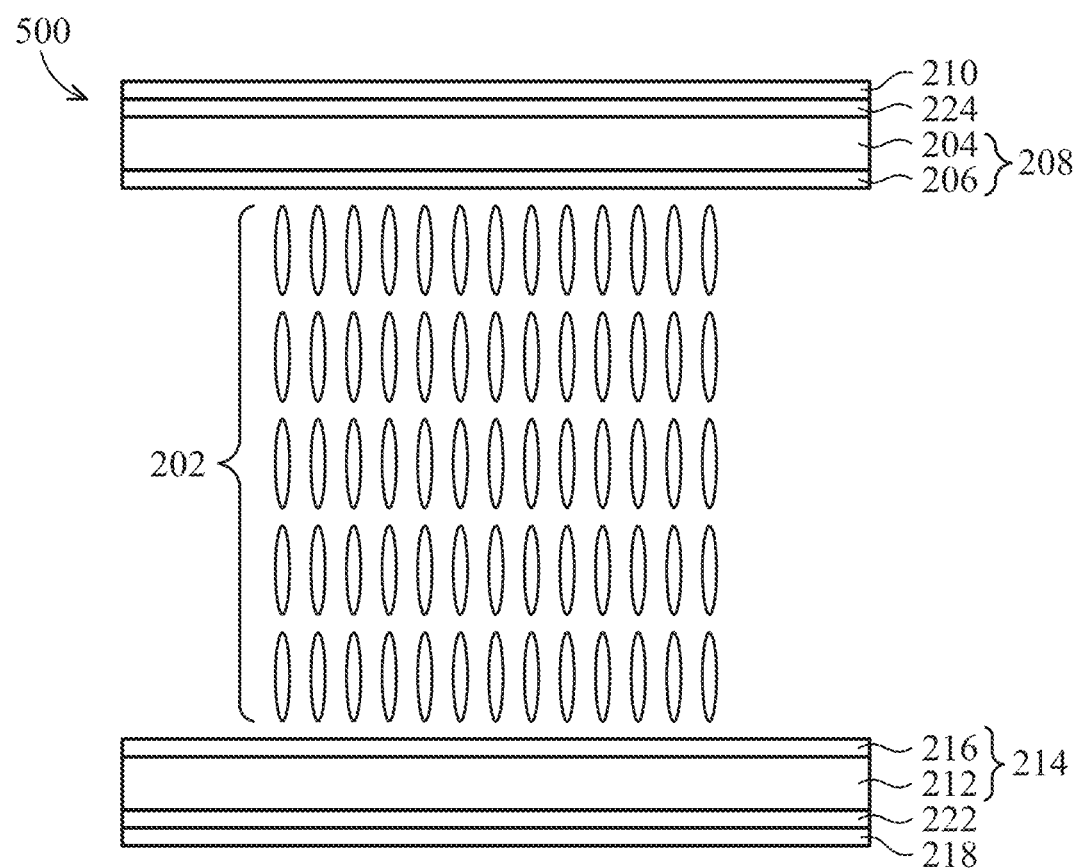
FIG. 1 is a cross sectional view showing one exemplary embodiment of a liquid crystal display device of the invention.

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

Embodiments provide a liquid crystal (LC) display device. An LC material with chiral dopants is used as an LC layer in one embodiment of the LC display device of the invention. Transmittance characteristics in a display region of the LC display device can be improved and optical dark lines generated in the boundary of the LC display device can be suppressed by the designs of the pixel electrode unit and the opposite electrode unit of the LC display device.

FIG. 1 is a cross sectional view showing one exemplary embodiment of a liquid crystal (LC) display device 500 of the invention. One exemplary embodiment of the LC display device 500 is a vertical alignment (VA) type LC display device. As shown in FIG. 1 the LC display device 500 comprises a first substrate 214 and a second substrate 208. The second substrate 208 is disposed opposite to the first substrate 214 and substantially parallel to the first substrate 214. In one embodiment, the first substrate 214 may serve as a thin film transistor (TFT) substrate, comprising a base 212, and at least one pixel unit. The pixel unit has a pixel electrode 216 and a TFT (not shown) disposed on the base 212. In one embodiment, the base 212 may comprise a glass substrate. Additionally, black matrixes (not shown) may be disposed between the pixel units.

The second substrate 208 may serve as a color filter (CF) substrate, comprising a base 204, an opposite electrode 206 and color filters (not shown). Additionally, black matrixes (not shown) may be disposed between the color filters. In one embodiment, the pixel electrode 216 and the opposite electrode 206 may comprise indium tin oxide (ITO) transparent electrodes, indium zinc oxide (IZO) transparent electrodes or aluminum-doped zinc oxide (AZO) transparent electrodes. In one embodiment, the pixel electrode 216 and the opposite electrode 206 may be patterned electrodes each having an electrode unit pattern.

The LC display device 500 further comprises a first polarizer 218 and a second polarizer 210. The first polarizer 218 is disposed under the first substrate 214, and the second polarizer 210 is disposed above the second substrate 208. In one embodiment, a polarization axis of the second polarizer 210 is vertical to that of the first polarizer 218. In one embodiment, the LC display device 500 further comprises a first compensation film 222 disposed between the first substrate 214 and the first polarizer 218, and a second compensation film 224 disposed between the second substrate 208 and the second polarizer 210.

As shown in FIG. 1, an LC layer 202 of the LC display device 500 is disposed between the first substrate 214 and the second substrate 208. In one embodiment, liquid crystal (LC) molecules of the LC layer 202 are formed by a nematic LC material, for example, a negative nematic LC or a positive nematic LC. Also, the LC layer 202 is added materials having chirality, for example, chiral dopants having left-handed chirality. Therefore, the LC molecules of the LC layer 202 may twist along an axis direction, thereby having the chirality, and the axis direction is parallel to a normal line of the first substrate 214.

Figure 2:
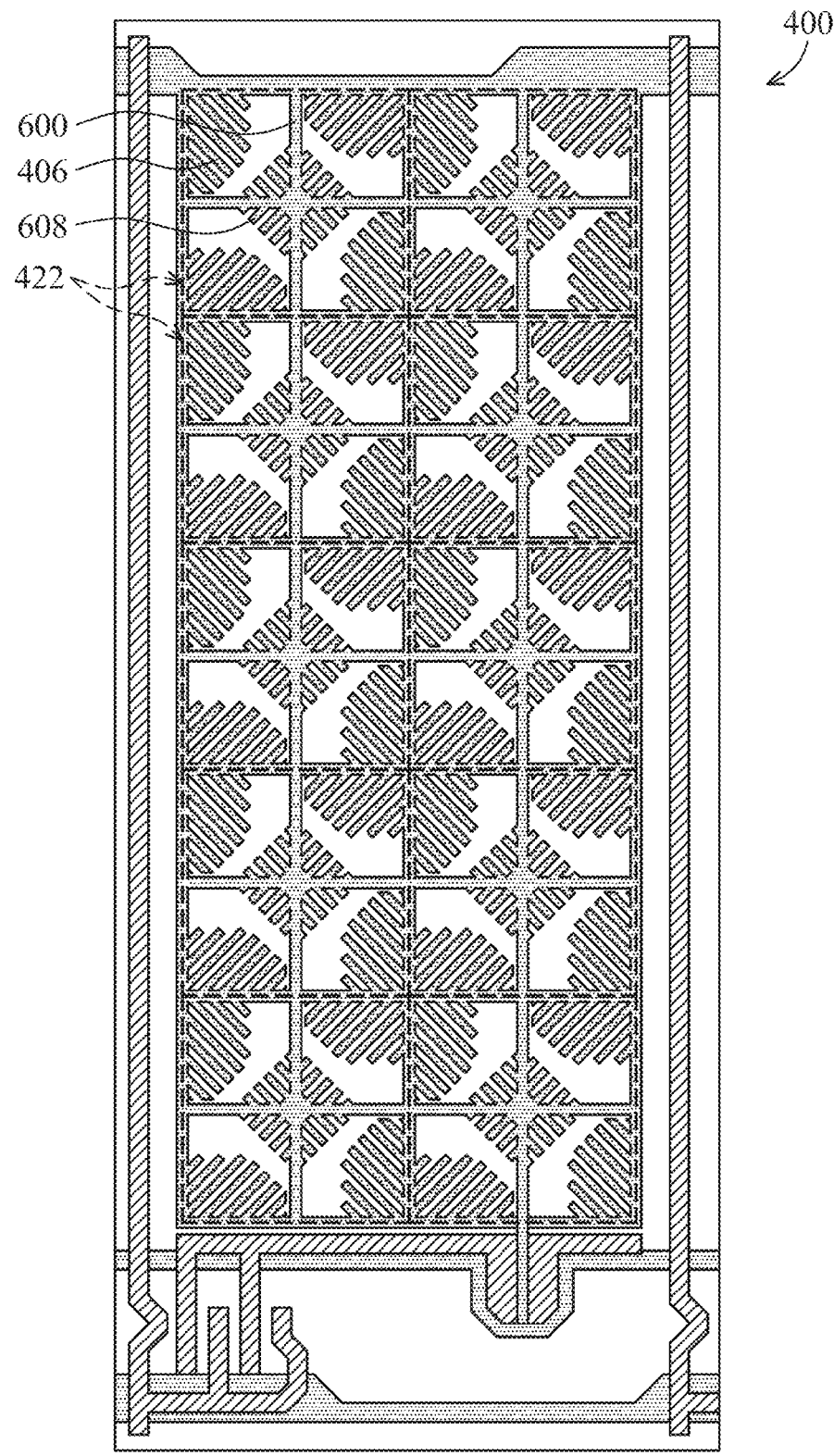
FIG. 2 is a top view showing one exemplary embodiment of electrode patterns of a liquid crystal display device of the invention.

FIG. 2 is a top view showing one exemplary embodiment of electrode patterns of a pixel 400 of a liquid crystal display device of the invention. The pixel 400 is constructed by a plurality of pixel units 422. The pixel electrode pattern and the opposite electrode pattern in each of the pixel units 422 are respectively a pixel electrode unit and an opposite electrode unit. In FIG. 2, the pixel electrode pattern on the first substrate (TFT side) overlaps with the opposite electrode pattern on the second substrate (CF side). In FIG. 2, slits of the pixel electrode pattern are labeled as 406, and slits of the opposite electrode pattern are labeled as 600 and 608 to facilitate showing occupied regions of the pixel electrode pattern and the opposite electrode pattern. Therefore, the occupied region of the pixel electrode pattern is a region without the slits 406, and the occupied region of the opposite electrode pattern is a region without the slits 600 and 608.

Figure 3A:
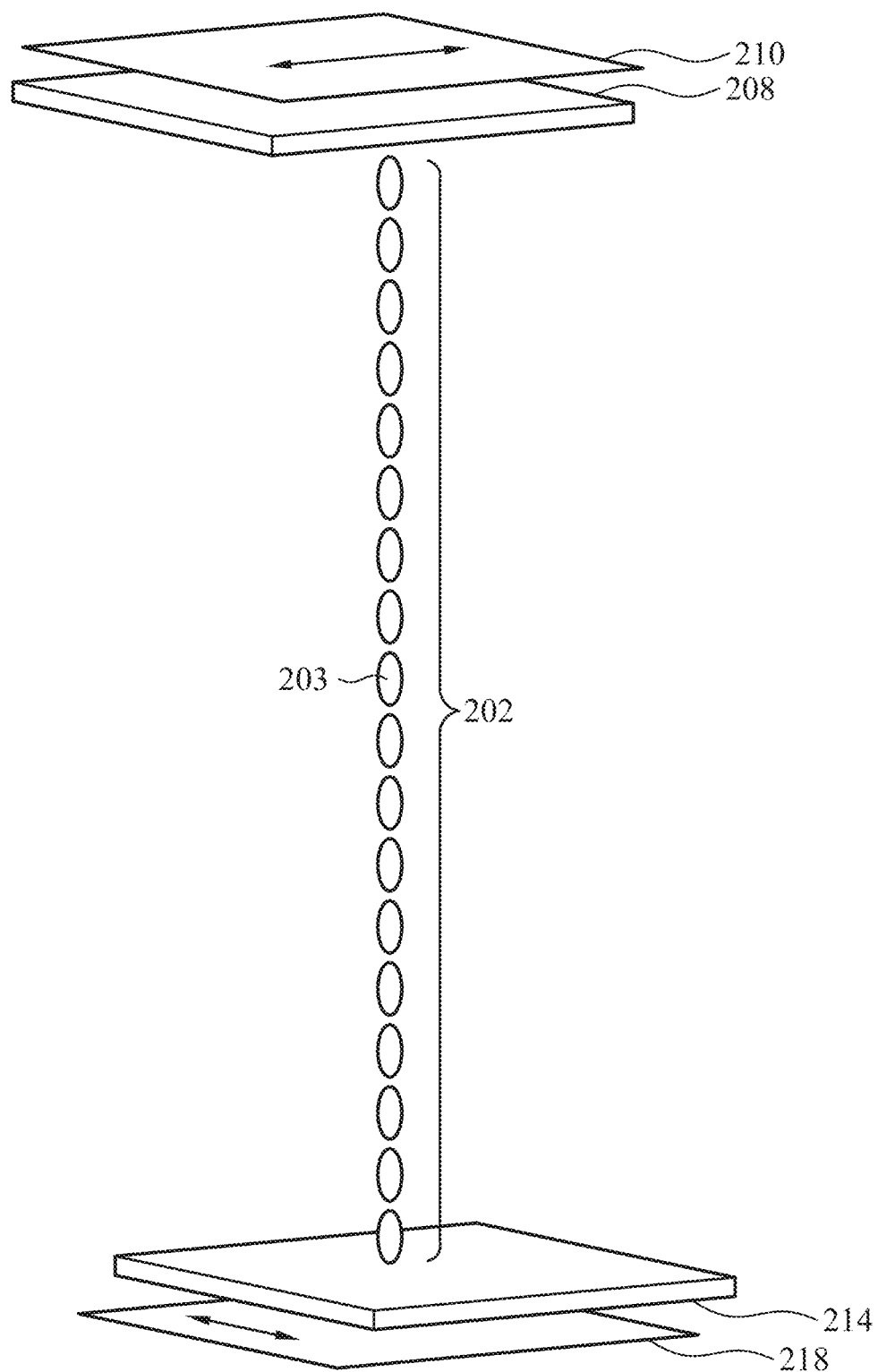
FIG. 3a is a side view showing one exemplary embodiment of vertical alignment type liquid crystal molecules of one exemplary embodiment of a liquid crystal display device of the invention without an electronic field applied thereto.
Figure 3B:
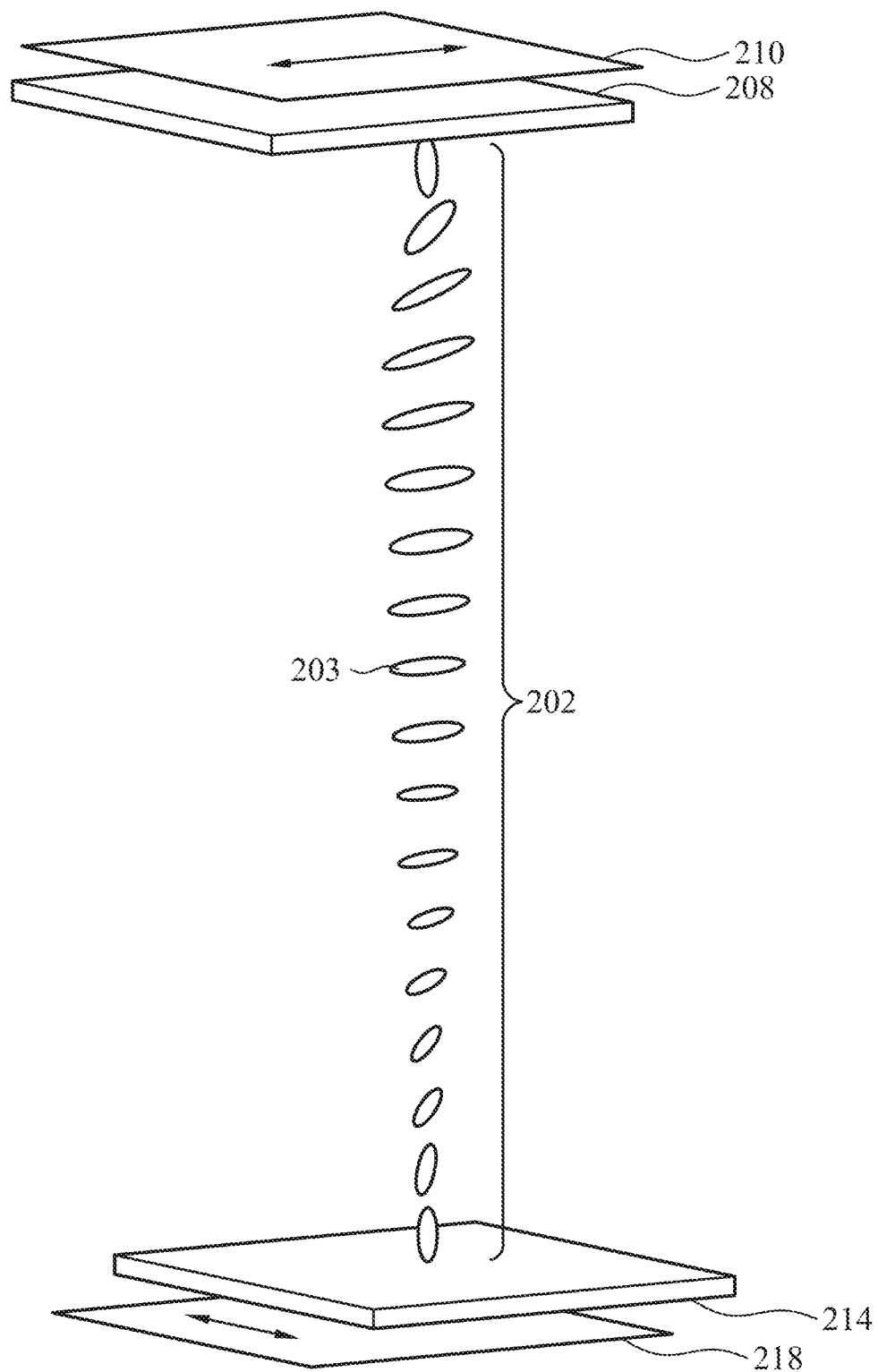
FIG. 3b is a side view showing one exemplary embodiment of vertical alignment type liquid crystal molecules of one exemplary embodiment of a liquid crystal display device of the invention with an electronic field applied thereto.

FIG. 3a is a side view of showing one exemplary embodiment of liquid crystal molecules 203 of the LC layer 202 with chiral dopants of the liquid crystal display device 500 of the invention without an electronic field applied between the first substrate 214 and the second substrate 208. The arrow directions on the first polarizer 218 and the second polarizer 210 illustrate directions of the polarization axis of the first substrate 214 and the second substrate 208, respectively. FIG. 3b is a side view of showing one exemplary embodiment of liquid crystal molecules 203 of the LC layer 202 with chiral dopants of the liquid crystal display device 500 of the invention with an electronic field applied between the first substrate 214 and the second substrate 208. As shown in FIG. 3b, because the LC layer 202 is added materials having chirality, for example, chiral dopants, the LC molecules 203 are gradually twisted from the first substrate 214 to the second substrate 208, and the LC molecules 203 are gradually tilted to be arranged along a horizontal direction and then the LC molecules 203 are tilted from the horizontal direction to a vertical direction. When the applied electronic field is increased, a range of the LC molecules 203 tilted to the horizontal arrangement is increased. The twist angle of the LC molecules can be defined by controlling the concentration of the chiral dopants. If a thickness of the LC layer is represented as d, a pitch of the chiral dopants is represented as p, and a parameter of the LC rotations is represented as a d/p ratio. In one embodiment, a parameter of the LC rotations (d/p ratio) of the LC layer 202 with chiral dopants is between 0.2 and 0.3, and a parameter of the optical path difference ($\Delta$nd) of the LC layer with chiral dopants is between 330 nm and 550 nm, wherein d is a thickness of the LC layer with chiral dopants, p is a pitch of the chiral dopants, and $\Delta$n is a birefringence coefficient of the LC layer 202 with chiral dopants.

Figure 4B:
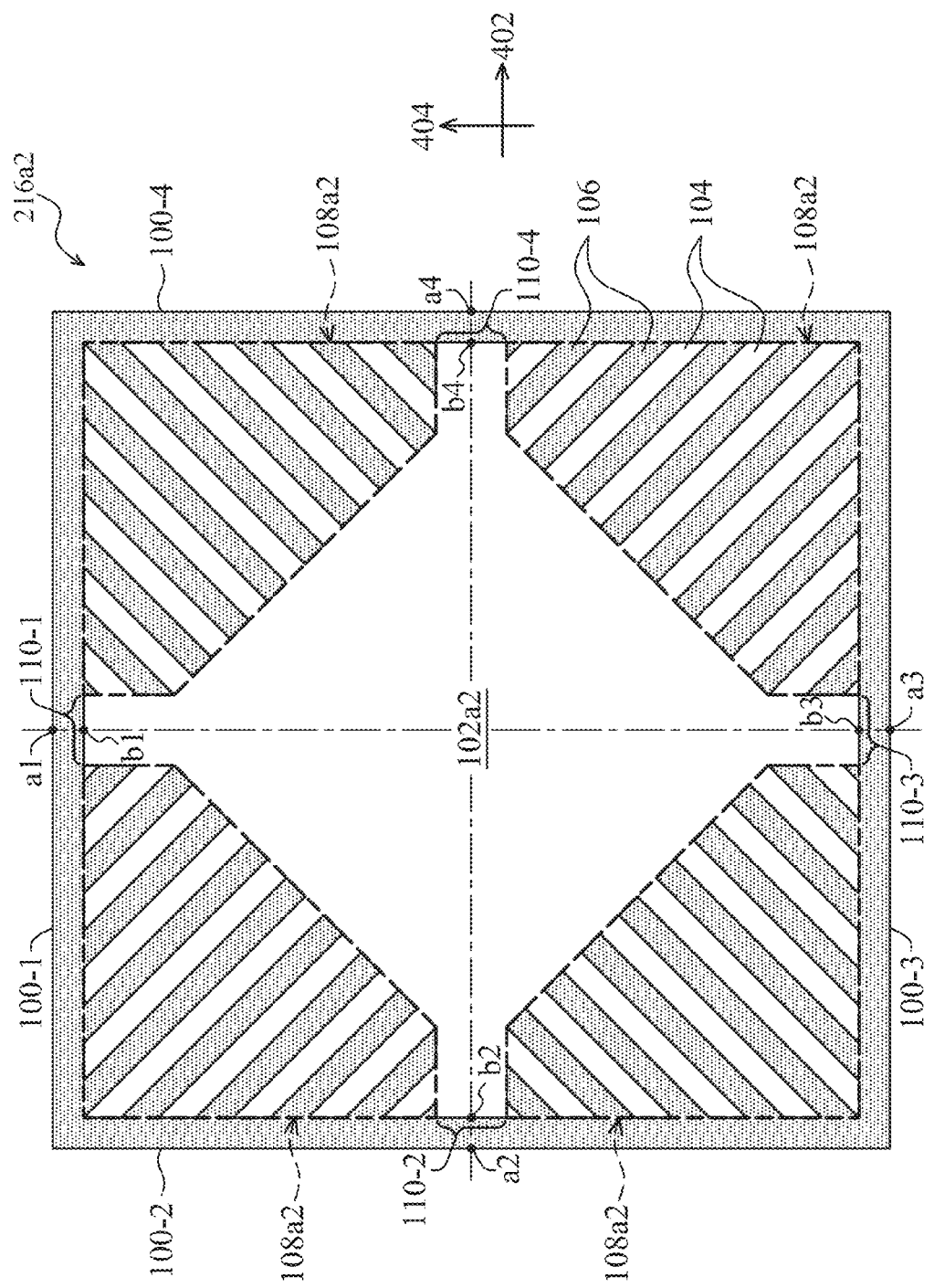
FIGS. 4b-4c illustrate top views of other comparable embodiments of a pixel electrode unit a liquid crystal display device.
Figure 4C:
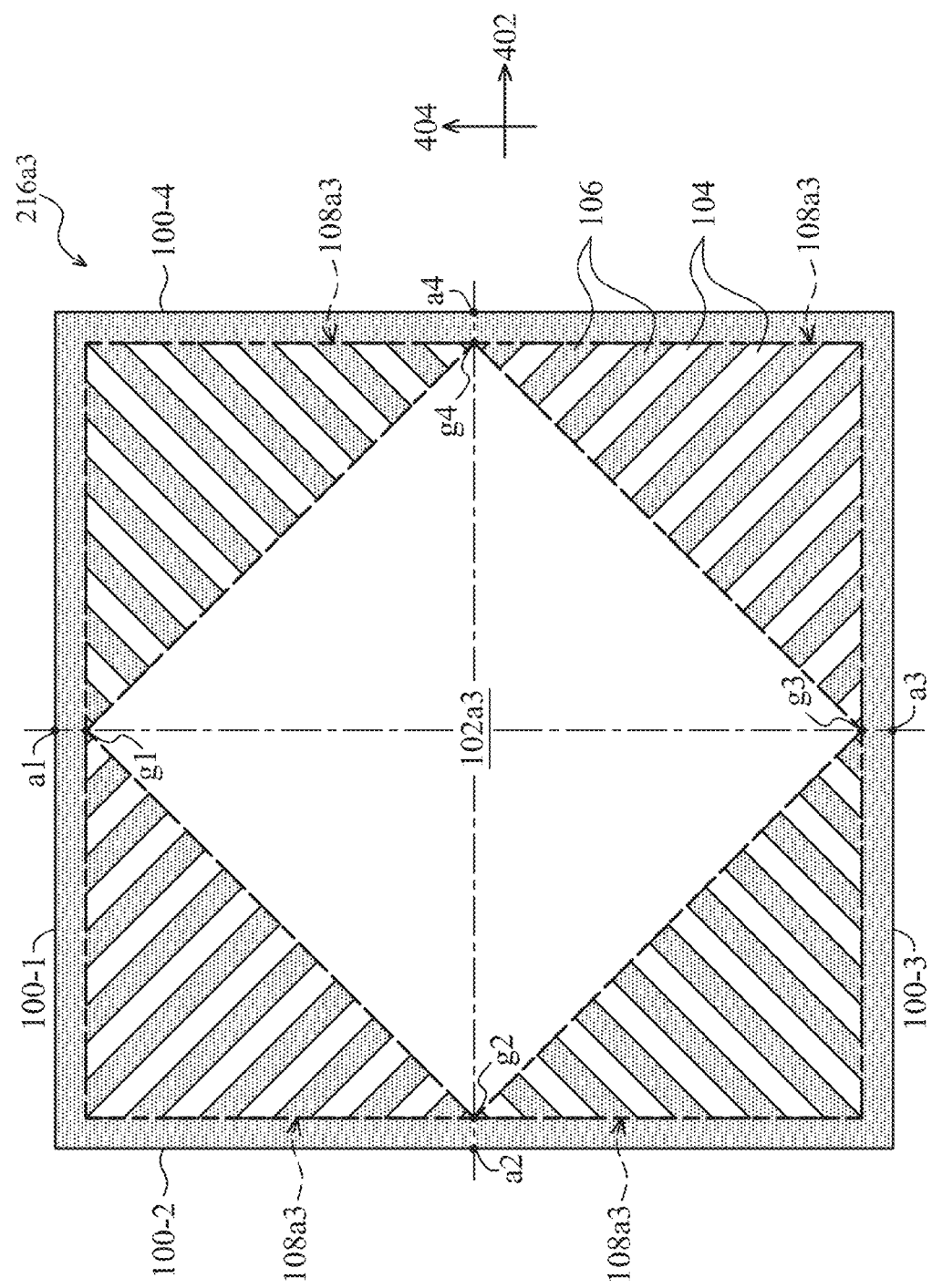

Next, a relationship between different designs of pixel electrode patterns and opposite electrode patterns and optical dark lines of a liquid crystal display device, which is constructed by a LC layer added chiral dopants having left-handed chirality, is described using comparable embodiments of a liquid crystal display device. FIGS. 4a-4c respectively illustrate top views of various comparable embodiments of pixel electrode units 216a1~216a3 of a liquid crystal display device. As shown in FIG. 4a, one comparable embodiment of a pixel electrode unit 216a1 of a pixel unit may comprise a primary electrode region 102a1 and a slit region 108a1 adjacent to the primary electrode region 102a1. The slit region 108a1 may comprise a plurality of branch sub-electrodes 104 and a plurality of slits 106. Any two adjacent branch sub-electrodes 104 are separated by one of the slits 106. As shown in FIG. 4a, the pixel unit has a first boundary 100-1 along a horizontal direction 402 of an upper portion of the pixel unit, and the first boundary 100-1 has a central point a1. Also, the primary electrode region 102a1 has a first side 110-1 along the horizontal direction 402 of an upper portion of the primary electrode region 102a1, and the first side 110-1 has a central point b1. The central point a1 of the first boundary 100-1 and the central point b1 of the first side 110-1 are both on the line (shown as a dotted line of FIG. 4a) along a vertical direction 404. Additionally, the pixel unit has a second boundary 100-2 along the vertical direction 404 of a left portion of the pixel unit, and the second boundary 100-2 has a third central point a2. Also, the primary electrode region 102a1 has a second side 110-2 along the vertical direction 404 of a left portion of the primary electrode region 102a1, and the second side 110-2 has a central point b2. The central point a2 of the second boundary 100-2 and the central point b2 of the second side 110-2 are both on the line (shown as a dotted line of FIG. 4a) along the horizontal direction 402. Further, the pixel unit has a third boundary 100-3 along the horizontal direction 402 of a lower portion of the pixel unit, and the third boundary 100-3 has a central point a3. Also, the primary electrode region 102a1 has a third side 110-3 along the horizontal direction 404 of a lower portion of the primary electrode region 102a1, and the third side 110-3 has a central point b3. The central point a3 of the third boundary 100-3 and the central point b3 of the third side 110-3 are both on the line (shown as a dotted line of FIG. 4a) along the vertical direction 404. Moreover, the pixel unit has a fourth boundary 100-4 along the vertical direction 404 of a right portion of the pixel unit, and the fourth boundary 100-4 has a central point a4. Also, the primary electrode region 102a1 has a fourth side 110-4 along the vertical direction 404 of a right portion of the primary electrode region 102a1, and the fourth side 110-4 has a central point b4. The central point a4 of the fourth boundary 100-4 and the central point b4 of the fourth side 110-4 are both on the line (shown as a dotted line of FIG. 4a) along the horizontal direction 402. An angle between the horizontal direction 402 and the vertical direction 404 and the slits 106 of the slit region 108a1 of the pixel electrode unit 216a of the comparable embodiments of a liquid crystal display device are both 45 degrees. As shown in FIG. 4a, the pixel electrode unit 216a is symmetrical for both sides.

FIGS. 4b-4c illustrate top views of other comparable embodiments of pixel electrode units 216a2-216a3 a liquid crystal display device. A difference between the pixel electrode units 216a2-216a3 and the pixel electrode unit 216a1 as shown in FIG. 4a is that areas of the primary electrode regions 102a2-102a3 of the pixel electrode units 216a2-216a3 are different from an area of the primary electrode region 102a1 of the pixel electrode unit 216a1. Therefore, areas of slit regions 108a2-108a3 of the pixel electrode units 216a2-216a3 are different from that of the slit region 108a1 of the pixel electrode unit 216a1. As shown in FIG. 4c, an apex g1 and the central point a1 of the first boundary 100-1 are both on the line (shown as a dotted line of FIG. 4c), an apex g2 and the central point a2 of the second boundary 100-2 are both on the line (shown as a dotted line of FIG. 4c), an apex g3 and the central point a3 of the third boundary 100-3 are both on the line (shown as a dotted line of FIG. 4c), and apex g4 and the central point a4 of the fourth boundary 100-4 are both on the line (shown as a dotted line of FIG. 4c).

FIG. 4d illustrates a top view of another comparable embodiment of the opposite electrode unit 206a1 of a liquid crystal display device. As shown in FIG. 4d, the comparable embodiment of the opposite electrode unit 206a1 may comprise a cross primary slit 300, a primary electrode region 302a1 and a sub-slit region 304a1, surrounded by the primary electrode region 302a1. In this comparable embodiment the cross primary slit 300 of the opposite electrode unit 206a1 respectively extends along the horizontal direction 402 and the vertical direction 404. As shown in FIG. 4d, the sub-slit region 304a1 of the opposite electrode unit 206a1 is diamond shaped. A first apex c1 and a third apex c3 are aligned to the cross primary slit 300 along the vertical direction 404. Additionally, a second apex c2 and a fourth apex c3 are aligned to the cross primary slit 300 along the horizontal direction 402. An angle between the horizontal direction 402 and the vertical direction 404 and the slits 106 of the sub-slit region 304a1 of the opposite electrode unit 206a1 are both 45 degrees. As shown in FIG. 4d, the opposite electrode unit 206a1 is symmetrical for both sides.

Figure 4E:
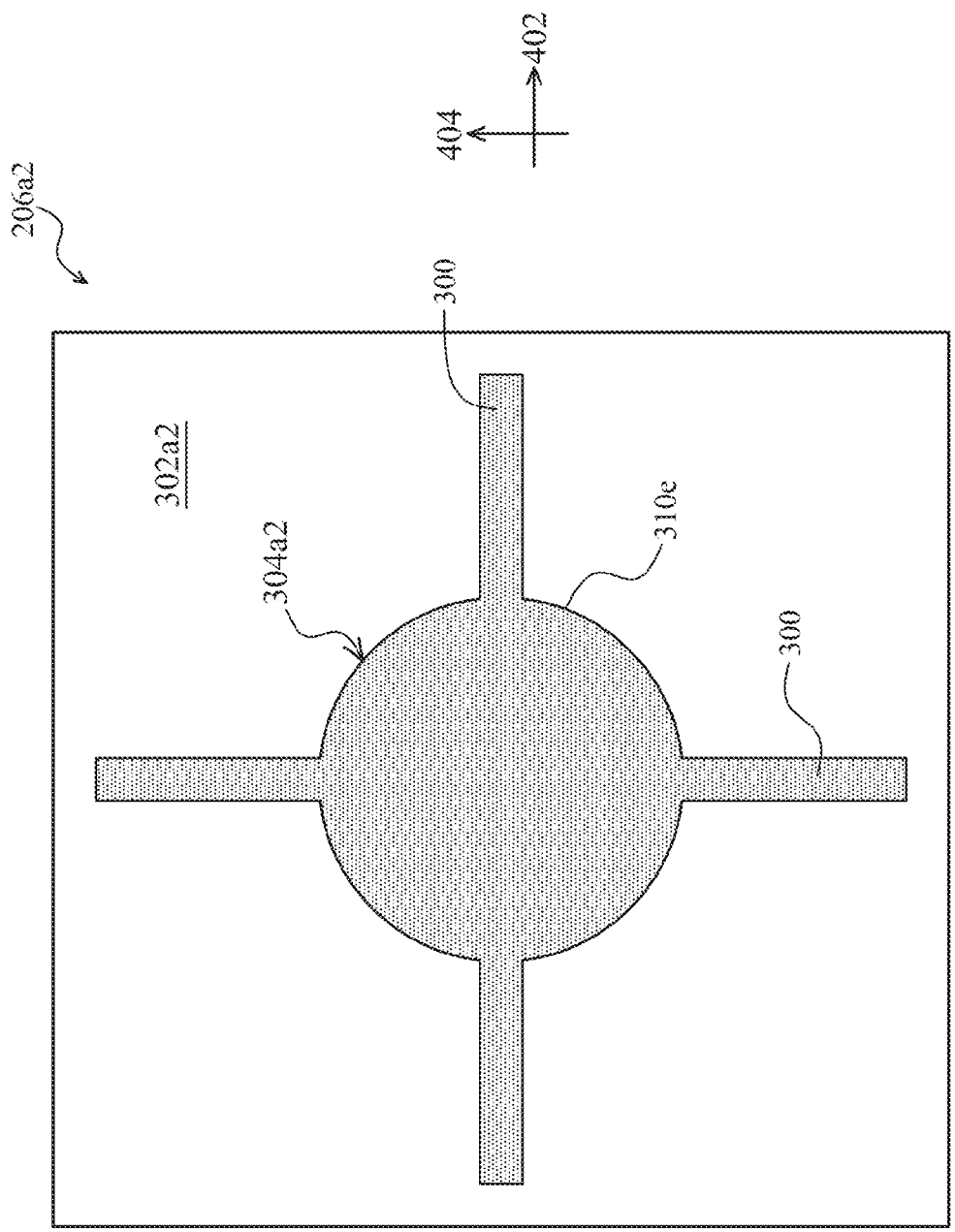

FIG. 4e illustrates a top view of yet another comparable embodiment of the opposite electrode unit 206a2 of a liquid crystal display device. As shown in FIG. 4e, a boundary of a sub-slit region 304a2 of an opposite electrode unit 206a2, surrounded by the primary electrode region 302a2 is circular shaped. In another comparable embodiment, a boundary of the sub-slit region of the opposite electrode unit surrounded by the primary electrode region may be diamond shaped. Further, in another comparable embodiment, the opposite electrode unit may have a cross primary slit only.

Figure 4F:
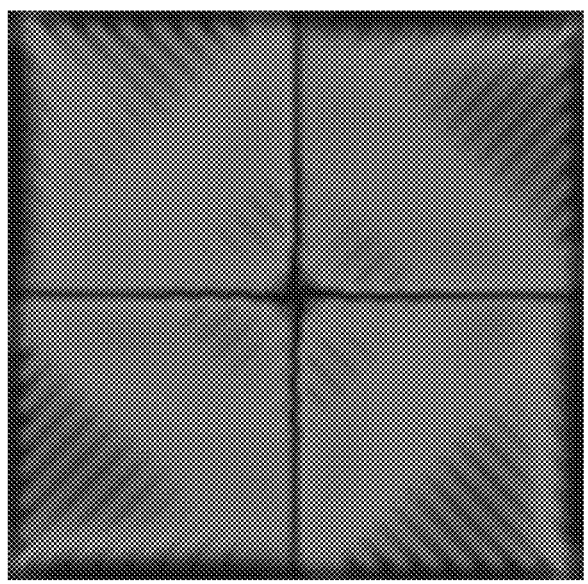
FIG. 4f is a transmittance diagram showing one comparable embodiment of a display area of a liquid crystal device constructed by the pixel electrode unit as shown in FIG. 4a and the opposite electrode unit as shown in FIG. 4d.

FIG. 4f is a transmittance diagram showing one comparable embodiment of a display area of a liquid crystal device constructed by the pixel electrode unit 216a1 as shown in FIG. 4a and the opposite electrode unit 206a1 as shown in FIG. 4d. As shown in FIG. 4f, a projection of the sub-slit region 304a1 of the opposite electrode unit 206a1 as shown in FIG. 4d is located in the primary electrode region 102a1 of the pixel electrode unit 216a1 as shown in FIG. 4a. FIG. 4f shows that a distribution characteristic of optical dark lines of one comparable embodiment of a liquid crystal device, constructed by the pixel electrode unit 216a1 and the opposite electrode unit 206a1, which are symmetrical for both sides, and a liquid crystal (LC) layer with chiral dopants, which has left-handed chirality. As shown in FIG. 4f, a simulated transmittance (T %) value of one comparable embodiment of a liquid crystal device is about 27.283%. Also, a right boundary of a first quadrant and a left boundary of a third quadrant are darker than a left boundary of a second quadrant and a right boundary of a fourth quadrant. In other words, the left boundary of the second quadrant and a right boundary of the fourth quadrant are brighter the right boundary of the first quadrant and the left boundary of the third quadrant.

Figure 5A:
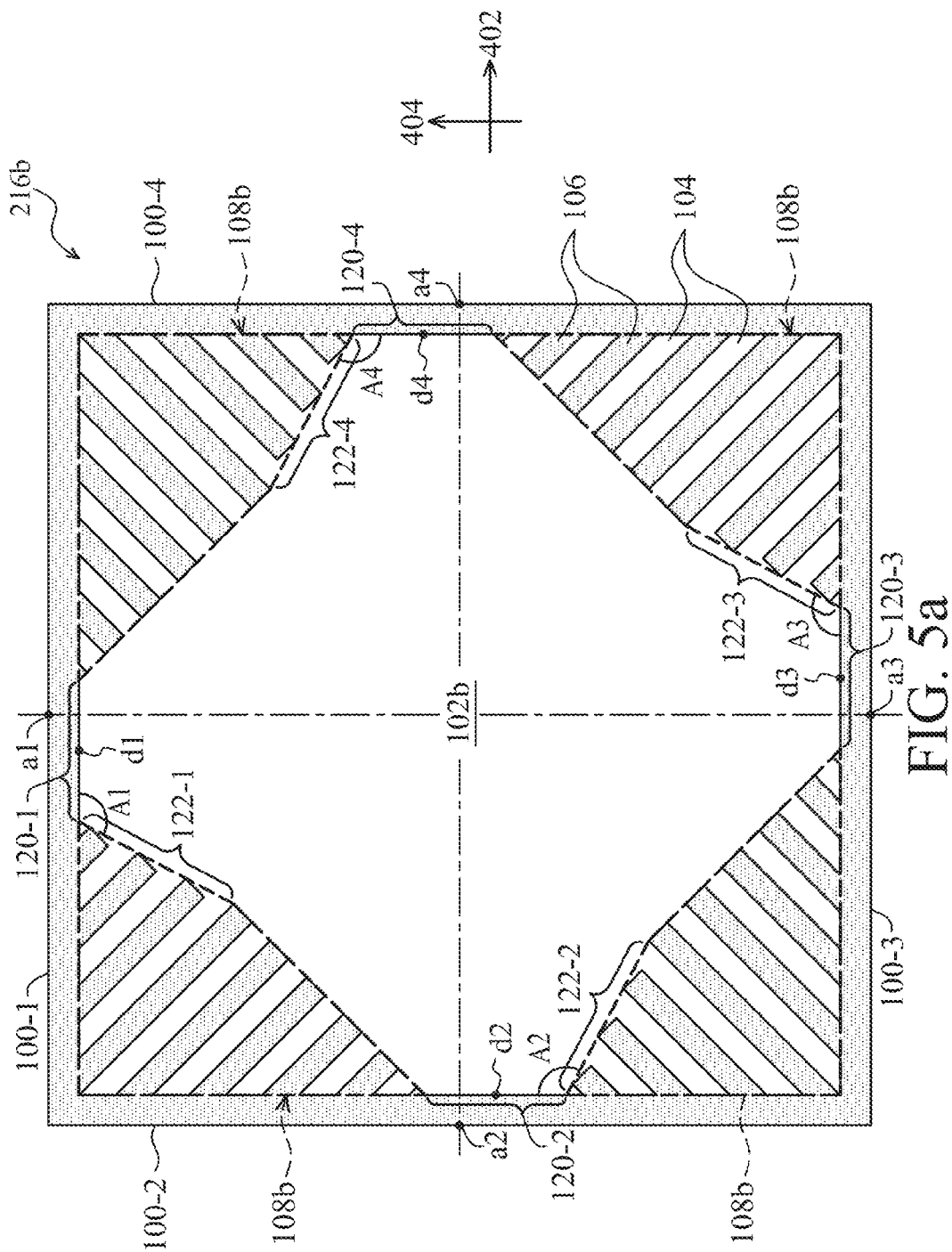
FIGS. 5a-5c illustrate top views of various exemplary embodiments of a pixel electrode unit of a liquid crystal display device of the invention.
Figure 5B:
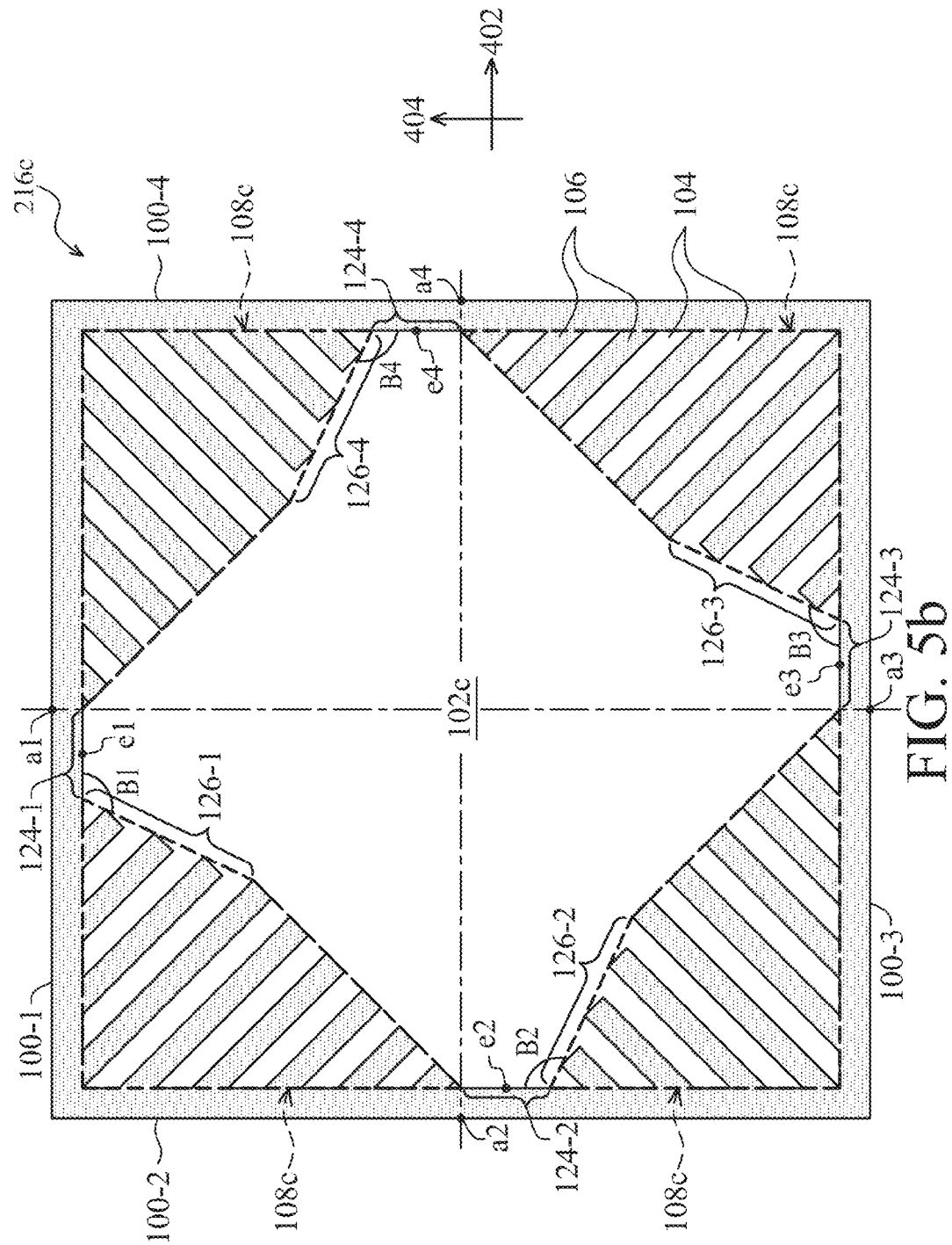
Figure 5C:
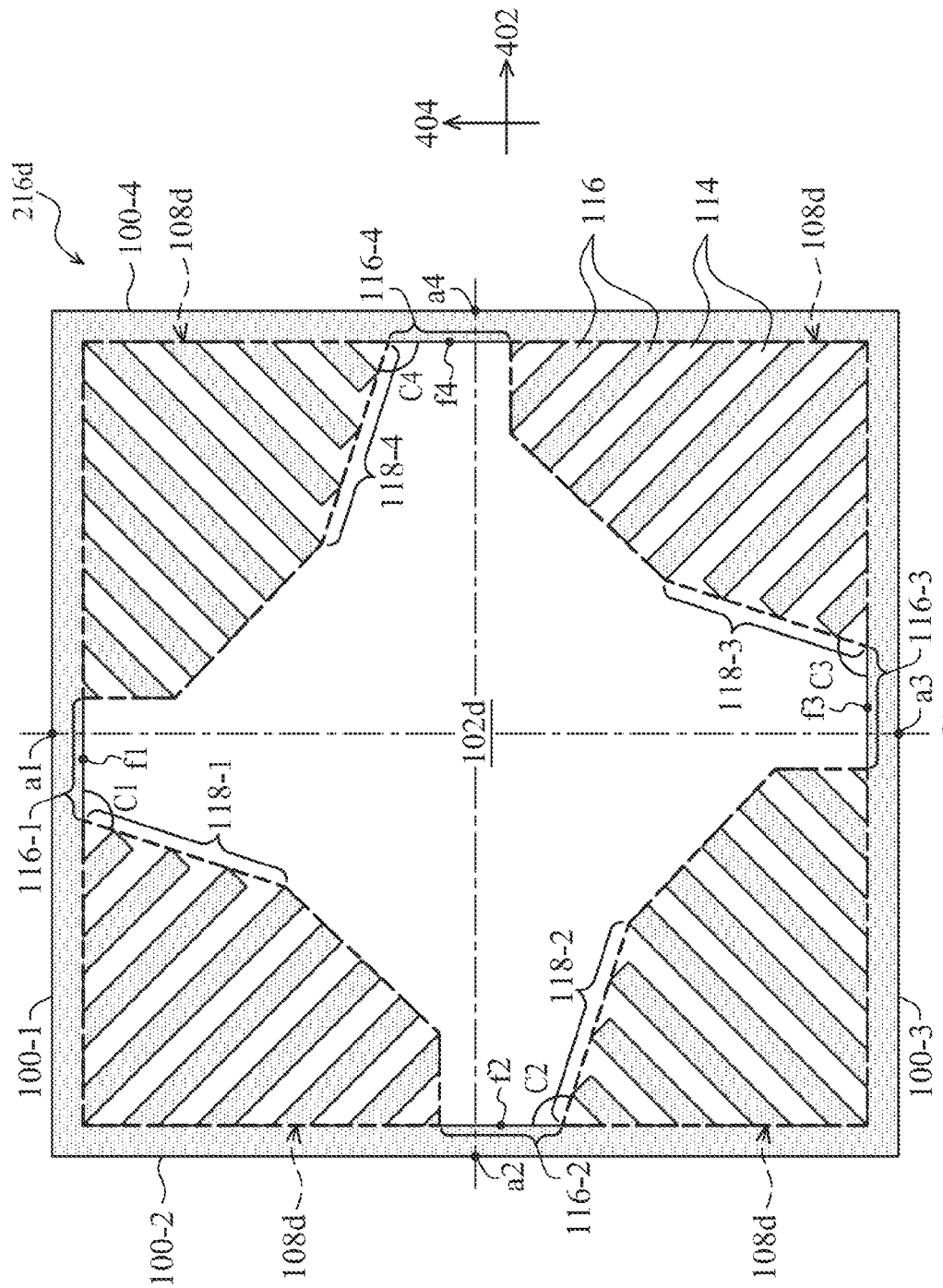

Designs of the pixel electrode unit and the opposite electrode unit can be modified to improve the transmittance of the liquid crystal device constructed by the LC layer with chiral dopants having left-handed chiralitys. FIGS. 5a-5c illustrate top views of various exemplary embodiments of pixel electrode units 216b, 216c, 216d and 216e of a liquid crystal display device of the invention. The transmittance of the liquid crystal device can be improved by increasing an area of the primary electrode region (an electrode area without slits within) of the pixel electrode unit. As shown in FIG. 5a, compared with the comparable embodiment of the pixel electrode unit 216a1 as shown in FIG. 4a, one embodiment of the upper portion of a primary electrode region 102b of the pixel electrode unit 216b1, has a first side 120-1 along the horizontal direction 402. The first side 120-1 has a central point d1. The central point d1 of the first side 120-1 is left to a central point a1 of the first boundary 100-1 of the pixel unit. Also, as shown in FIG. 5a, the primary electrode region 102b has a second side 122-1 left to the central point d1. A first angle A1 between the first and second sides 120-1 and 122-1 in the primary electrode region 102b is larger than 90 degrees or equal to 90 degrees. Additionally, in this embodiment, a left portion of the primary electrode region 102b has a third side 120-2, along the vertical direction 404. The third side 120-2 has a central point d2 below to the central point a2 of the second boundary 100-2 of the pixel unit. Also, as shown in FIG. 5a, the primary electrode region 102b has a fourth side 122-2 below to the central point d2. A second angle A2 between the third and fourth sides 120-2 and 122-2 in the primary electrode region 102b is larger than 90 degrees or equal to 90 degrees. Further, in this embodiment, a lower portion of the primary electrode region 102b has a fifth side 120-3, along the horizontal direction 402. The fifth side 120-3 has a central point d3 right to the central point a3 of the third boundary 100-3 of the pixel unit. Also, the primary electrode region 102b has a sixth side 122-3 right to the central point d3. A third angle A3 between the fifth and sixth sides 120-3 and 122-3 in the primary electrode region 102b is larger than 90 degrees or equal to 90 degrees. Moreover, in this embodiment, a right portion of the primary electrode region 102b has a seventh side 120-4, along the vertical direction 404. The seventh side 120-4 has a central point d4 up to the central point a4 of the fourth boundary 100-4 of the pixel unit. Also, as shown in FIG. 5a, the primary electrode region 102b has an eighth side 122-4 up to the central point d4. A fourth angle A4 between the seventh and eighth sides 120-4 and 122-4 in the primary electrode region 102b is larger than 90 degrees or equal to 90 degrees.

FIG. 5b illustrates a top view of another exemplary embodiment of a pixel electrode unit 216c of a liquid crystal display device of the invention. Compared with the comparable embodiment of the pixel electrode unit 216a3 as shown in FIG. 4c, a first side 124-1, a second side 124-1, a third side 124-3 and a fourth side 124-4 of a primary electrode region 102c of the pixel electrode unit 216c respectively have central points e1, e2, e3 and e4. Also, the central points e1, e2, e3 and e4 are respectively positioned left to the central point a1 of the first boundary 100-1, below to the central point a2 of the second boundary 100-2, right to the central point a3 of the third boundary 100-3 and up to the central point a4 of the fourth boundary 100-4 of the corresponding pixel unit. Also, as shown in FIG. 5b, a first angle B1 between the first side 124-1 and the second side 126-1, which is left to the central point e1, in the primary electrode region 102c, is larger than 90 degrees or equal to 90 degrees. A second angle B2 between the third side 124-2 and the fourth side 126-2, which is below to the central point e2, in the primary electrode region 102c, is larger than 90 degrees or equal to 90 degrees. A third angle B3 between the fifth side 124-3 and the sixth side 126-3, which is right to the central point e3, in the primary electrode region 102c, is larger than 90 degrees or equal to 90 degrees. A fourth angle A4 between the seventh side 124-4 and the eighth side 126-4, which is up to the central point e4, in the primary electrode region 102c, is larger than 90 degrees or equal to 90 degrees.

FIG. 5c illustrates a top view of another exemplary embodiment of a pixel electrode unit 216d of a liquid crystal display device of the invention. Compared with the comparable embodiment of the pixel electrode unit 216a2 as shown in FIG. 4b, a first side 116-1, a third side 116-2, a fifth side 116-3 and a seventh side 116-4 of an upper portion, a left portion, a lower portion and a right portion of a primary electrode region 102d of the pixel electrode unit 216d respectively have central points f1, f2, f3 and f4. Also, the central points f1, f2, f3 and f4 are respectively positioned left to the central point a1 of the first boundary 100-1, below to the central point a2 of the second boundary 100-2, right to the central point a3 of the third boundary 100-3 and up to the central point a4 of the fourth boundary 100-4 of the corresponding pixel unit. Also, as shown in FIG. 5c, a first angle C1 between the first side 116-1 and the second side 118-1, which is left to the central point f1, in the primary electrode region 102d, is larger than 90 degrees or equal to 90 degrees. A second angle C2 between the third side 116-2 and the fourth side 118-2, which is below to the central point f2, in the primary electrode region 102d, is larger than 90 degrees or equal to 90 degrees. A third angle C3 between the fifth side 116-3 and the sixth side 118-3, which is right to the central point f3, in the primary electrode region 102d, is larger than 90 degrees or equal to 90 degrees. A fourth angle C4 between the seventh side 116-4 and the eighth side 118-4, which is up to the central point f4, in the primary electrode region 102d, is larger than 90 degrees or equal to 90 degrees.

In other embodiments, it is noted that only one, two or three of the four central points of the first side, the third side, the fifth side and the seventh side of the primary electrode region of the pixel electrode unit 216b-216d as shown in FIGS. 5a-5c respectively designed to be positioned left to the central point a1 of the first boundary 100-1, below to the central point a2 of the second boundary 100-2, right to the central point a3 of the third boundary 100-3 and up to the central point a4 of the fourth boundary 100-4 of the corresponding pixel unit, can satisfy the requirement of transmittance improvement of the liquid crystal device. In other embodiments, it is noted that only one, two or three of the first, second, third and fourth angles of the pixel electrode unit 216b-216d as shown in FIGS. 5a-5c respectively designed to be larger than 90 degrees or equal to 90 degrees, can satisfy the requirement of transmittance improvement of the liquid crystal device.

Figure 6:
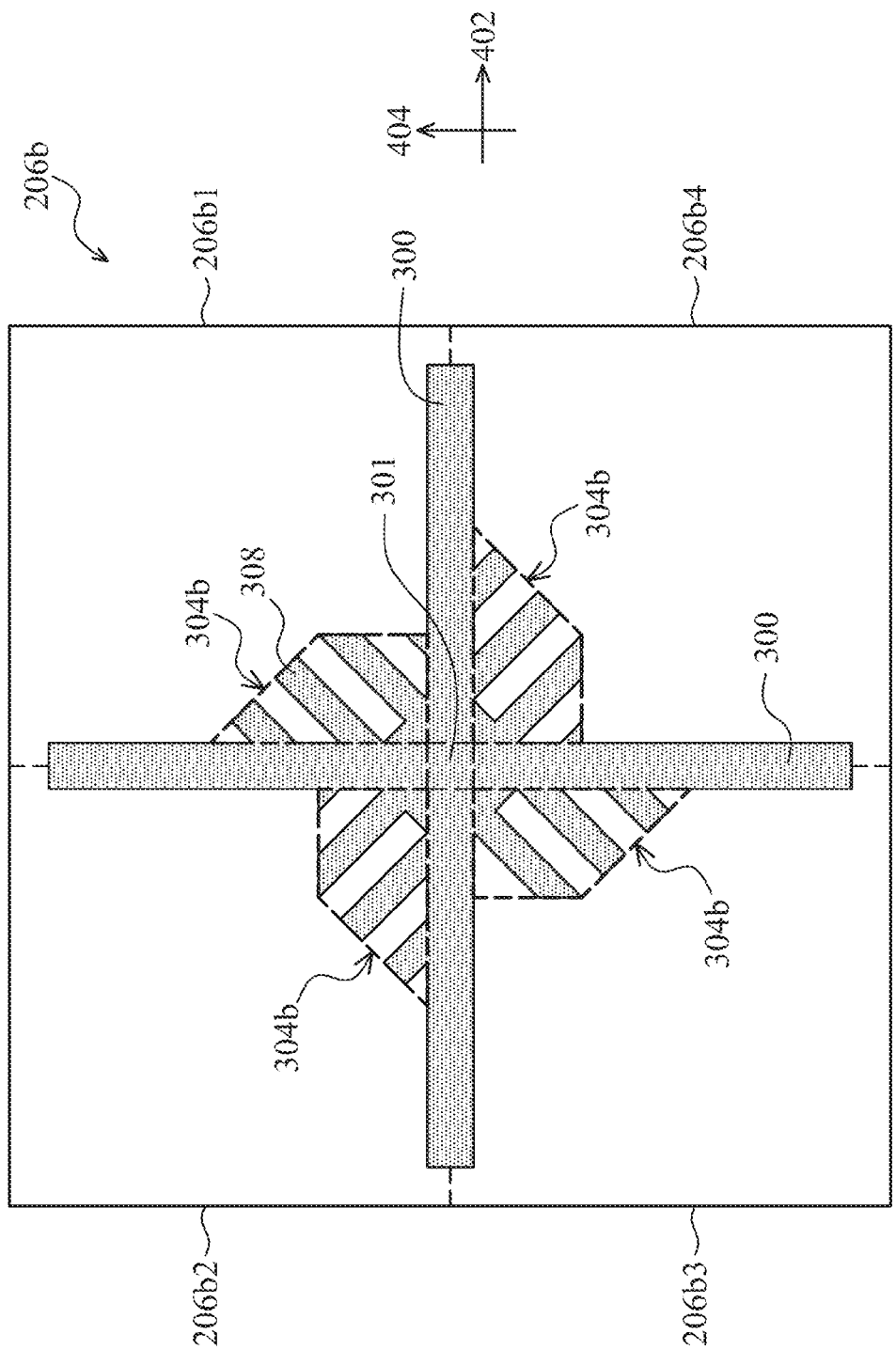
FIG. 6 illustrates a top view of another embodiment of the opposite electrode unit of a liquid crystal display device of the invention.

Additionally, the transmittance of the liquid crystal device can be improved by increasing an area of the primary electrode region (an electrode area without slits within) of the opposite electrode unit. FIG. 6 illustrates a top view of another embodiment of the opposite electrode unit 206b of a liquid crystal display device of the invention. Compared with the comparable embodiment of the opposite electrode unit 206a1 as shown in FIG. 4d, a cross primary slit 300 of the opposite electrode unit 206b, which extends along the horizontal direction 402 and the vertical direction 404, divides the opposite electrode unit 206b into four quadrants 206b1-206b4 as shown in FIG. 6. The shape if a sub-slit region 304b (i.e. a distribution region of slits 308) in at least one of the quadrants 206b1-206b4 substantially is trapezoid shaped. Additionally, as shown in FIG. 6, the sub-slit region 304b in at least one of the quadrants 206b1-206b4 has a repeatable arrangement by counterclockwise rotation along an outer-paper direction of a normal line of a crossing point 301 of the cross primary slit 300 with a rotating period of multiples of 90 degrees.

TABLE 1

Comparison of the transmittance of various embodiments of a display area of a liquid crystal display device constructed by various pixel electrode units and opposite electrode units

|  | comparable embodiment | embodiment 1 | embodiment 2 | embodiment 3 |
|---|---|---|---|---|
| pixel electrode unit | 216a1 | 216b | 216b | 216a1 |
| opposite electrode unit | 206a1 | 206a1 | 206b | 206b |
| Transmittance (%) (relative to the comparable embodiment) | 0 | 2.80% | 2.83% | 0.23% |

The transmittance of the liquid crystal device, constructed by the LC layer with chiral dopants, having left-handed chirality, can be improved by modifying designs of the pixel electrode unit and the opposite electrode unit. A numerical simulation method is used to analyze and calculate the fringing field effect and the transmittance corresponding to various embodiments of a liquid crystal display device constructed by combinations of the pixel/opposite electrode units and the LC layer with chiral dopants having the left-handed chirality. Table 1 is a comparison of the transmittance of various embodiments of a display area of a liquid crystal display device constructed by various pixel unit patterns and opposite electrode units. From the results of Table 1, when the central points of the first side, the third side, the fifth side and the seventh side of a primary electrode region of the pixel electrode unit are respectively positioned left to the central point of the first boundary, below to the central point of the second boundary, right to the central point of the third boundary and up to the central point of the fourth boundary of the corresponding pixel unit (i.e. the pixel electrode unit 216b), the transmittance can be improved. Alternatively, when the shape of the sub-slit region in at least one of the quadrants divided by the cross primary slit of the opposite electrode unit substantially is trapezoid shaped and has a repeatable arrangement by counterclockwise rotating the opposite electrode unit along an outer-paper direction of a normal line of a crossing point of the cross primary slit with a rotating period of multiples of 90 degrees (i.e. the opposite electrode unit 206b), the transmittance can be improved (please refer to the embodiments 1 and 3 of Table 1). The pixel electrode unit has a greater effect on the transmittance than the opposite electrode unit. More preferably, a liquid crystal display device constructed by the pixel electrode unit 216b and the opposite electrode unit 206b has the best transmittance performance (embodiment 2) than other embodiments of Table 1. Therefore, the design of the pixel electrode unit and the opposite electrode unit is required to match the chirality of the LC layer with chiral dopants.

TABLE 2

Comparison of the transmittance of various embodiments of a display area of a liquid crystal display device constructed by various pixel electrode units and opposite electrode units

|  |  | comparable embodiment | embodiment 4 | embodiment 5 |
|---|---|---|---|---|
| pixel electrode unit | reference numeral | 216a1 | 216e | 216b |
|  | angles of the first angle to the fourth angle | NA | larger than 90 degrees and smaller than 180 degrees | substantially equal to 90 degrees |
| pixel electrode unit | reference numeral | 206a1 | 206a1 | 206a1 |
| Transmittance (%) (relative to the comparable embodiment) |  | 0 | 1.84% | 3.10% |

Alternatively, the transmittance of the liquid crystal device, constructed by the LC layer with chiral dopants having hand twist characteristics, can be improved by changing the first angle to the fourth angle of the primary electrode region of the pixel electrode unit to increase an area of the primary electrode region (an electrode area without slits within) of the pixel electrode unit. A numerical simulation method is used to analyze and calculate the fringing field effect and the transmittance corresponding to various embodiments of a liquid crystal display device constructed by combinations of the pixel/opposite electrode units and the LC layer with chiral dopants having the left-handed chirality. Table 2 is a comparison of the transmittance of various embodiments of a display area of a liquid crystal display device constructed by various pixel electrode units and opposite electrode units. From the results of Table 2, when the first angle to the fourth angle of the primary electrode region of the pixel electrode unit is designed to be larger than 90 degrees and smaller than 180 degrees (i.e. the pixel electrode unit 216e) or substantially equal to 90 degrees (i.e. the pixel electrode unit 216b), the transmittance can be improved by about 1.84% and 3.1% (please refer to the embodiments 4 and 5 of Table 2) higher than comparable embodiments, respectively. Particularly, when the first angle to the fourth angle of the primary electrode region of the pixel electrode unit is designed to be close to 90 degrees (please refer to the embodiment 5 of Table 2), the transmittance has the best result, which is about 3.1% better than the comparable embodiment.

Embodiments provide a liquid crystal (LC) display device using LC material with chiral dopants having the left-handed chirality as a LC layer. The LC display device may improve a total area of the transparent electrodes (transmittance) by modifying the designs of the pixel electrode unit and the opposite electrode units. For example, there is only one, two, or three or all of the four central points of a first side of an upper portion, a third side of a left portion, a fifth side of a lower portion and a seventh side of a right portion of a primary electrode region of the pixel electrode unit, designed respectively positioned left to a central point of a first boundary, below to a central point of a second boundary, right to a central point of a third boundary and up to a central point of a fourth boundary of the corresponding pixel unit, to improve the total area of the transparent electrodes. Also, it is noted that there is only one, two, or three or all of a first angle between the first side and the second side left to the central point of the first side, a second angle between the third side and the fourth side below to the central point of the third side, a third angle between the fifth side and the sixth side right to the central point of the fifth side, and a fourth angle between the seventh side and the eighth side up to the central point of the seventh side, of the pixel electrode unit, designed to be larger than 90 degrees and equal to 90 degrees, to improve the total area of the transparent electrodes. Alternatively, an occupied area of the sub-slit region of the opposite electrode unit can be reduced to improve the total area of the transparent electrodes (transmittance) so that the shape of the sub-slit region in at least one of the quadrants divided by the cross primary slit of the opposite electrode unit substantially is trapezoid shaped. Alternatively, when the sub-slit region in at least is one of the quadrants is a repeatable arrangement by counterclockwise rotating the sub-slit region along an outer-paper direction of a normal line of a crossing point of the cross primary slit with a rotating period of multiples of 90 degrees, the total area of the transparent electrodes (transmittance) can be improved. From the aforementioned results, in other embodiments using the LC material with chiral dopants having the right-handed chirality as a LC layer, there is only one, two, or three or all of the four central points of a first side of an upper portion, a third side of a left portion, a fifth side of a lower portion and a seventh side of a right portion of a primary electrode region of the pixel electrode unit, designed respectively positioned right to a central point of a first boundary, up to a central point of a second boundary, left to a central point of a third boundary and below to a central point of a fourth boundary of the corresponding pixel unit, to improve the total area of the transparent electrodes. Also, it is noted that there is only one, two, or three or all of a first angle between the first side and the second side right to the central point of the first side, a second angle between the third side and the fourth side up to the central point of the third side, a third angle between the fifth side and the sixth side left to the central point of the fifth side, and a fourth angle between the seventh side and the eighth side below to the central point of the seventh side, of the pixel electrode unit, designed to be larger than 90 degrees and equal to 90 degrees, to improve the total area of the transparent electrodes. Alternatively, when the sub-slit region in at least is one of the quadrants is a repeatable arrangement by clockwise rotating the sub-slit region along an outer-paper direction of a normal line of a crossing point of the cross primary slit with a rotating period of multiples of 90 degrees, the total area of the transparent electrodes (transmittance) can be improved. The transmittance of the total display area of the LC) display device can be improved and the optical dark lines can be eliminated by modifying the designs of the pixel electrode unit and the opposite electrode units.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
    a first substrate having a pixel unit, wherein the pixel unit has a pixel electrode unit, and the pixel electrode unit comprises a primary electrode region and a slit region;
    a second substrate disposed opposite to the first substrate, having an opposite electrode unit;
    a first polarizer disposed under the first substrate;
    a second polarizer disposed above the second substrate, wherein a polarization axis of the second polarizer is vertical to that of the first polarizer; and
    a liquid crystal (LC) layer with chiral dopants disposed between the first and second substrates;
    wherein the pixel unit has a first boundary along a horizontal direction of an upper portion of the pixel unit, and the first boundary has a first central point;
    the primary electrode region has a first side along the horizontal direction of an upper portion of the primary electrode region, and the first side has a second central point left to the first central point; and
    the primary electrode region has a second side located on the left to the second central point, and a first angle between the first and second sides in the primary electrode region is larger than 90 degrees or equal to 90 degrees.

2. The liquid crystal display device as claimed in claim 1, wherein a parameter of the LC rotations (d/p ratio) of the LC layer with chiral dopants is between 0.2 and 0.3, and a parameter of the optical path difference ($\Delta nd$) of the LC layer with chiral dopants is between 330 nm and 550 nm, and wherein d is a thickness of the LC layer with chiral dopants, p is a pitch of the chiral dopants, and $\Delta n$ is a birefringence coefficient of the LC layer with chiral dopants.

3. The liquid crystal display device as claimed in claim 1, wherein the pixel unit further comprises a second boundary along a vertical direction of a left portion of the pixel unit, and the second boundary has a third central point;
    the primary electrode region has a third side along the vertical direction of a left portion of the primary electrode region, and the third side has a fourth central point below to the third central point; and
    the primary electrode region has a fourth side located below to the third central point, and a second angle between the third and fourth sides in the primary electrode region is larger than 90 degrees or equal to 90 degrees.

4. The liquid crystal display device as claimed in claim 1, wherein the pixel unit further comprises a third boundary along the horizontal direction of a lower portion of the pixel unit, and the third boundary has a fifth central point;
    the primary electrode region has a fifth side along the horizontal direction of a lower portion of the primary electrode region, and the fifth side has a sixth central point right to the fifth central point; and
    the primary electrode region has a sixth side located right to the fifth central point, and a third angle between the fifth and sixth sides in the primary electrode region is larger than 90 degrees or equal to 90 degrees.

5. The liquid crystal display device as claimed in claim 1, wherein the pixel unit further comprises a fourth boundary along a vertical direction of a right portion of the pixel unit, and the fourth boundary has a seventh central point;
    the primary electrode region has a seventh side along the vertical direction of a right portion of the primary electrode region, and the seventh side has an eighth central point up to the seventh central point; and
    the primary electrode region has an eighth side located up to the seventh central point, and a fourth angle between the seventh and eighth sides in the primary electrode region is larger than 90 degrees or equal to 90 degrees.

6. The liquid crystal display device as claimed in claim 1, wherein the opposite electrode unit comprises:
    a primary electrode region; and
    a cross primary slit respectively extending along the horizontal direction and a vertical direction, surrounded by the primary electrode region.

7. The liquid crystal display device as claimed in claim 6, further comprising:
    a sub-slit region surrounded by the primary electrode region, wherein a central point of the sub-slit region overlaps with a crossing point of the cross primary slit, and wherein the shape of the sub-slit region is diamond shaped or circular shaped.

8. The liquid crystal display device as claimed in claim 7, wherein an angle between the horizontal direction or the vertical direction and slits of the slit region of the pixel electrode unit and an angle between the horizontal direction or the vertical direction and sub-slits of the sub-slit region are both 45 degrees.

9. The liquid crystal display device as claimed in claim 7, wherein a projection of the sub-slit region of the opposite electrode unit is in the primary electrode region of the pixel electrode unit.

10. A liquid crystal display device, comprising:
    a first substrate having a pixel unit, wherein the pixel unit has a pixel electrode unit;
    a second substrate disposed opposite to the first substrate, having an opposite electrode unit, wherein the opposite electrode unit comprises a cross primary slit dividing the opposite electrode unit into four quadrants, and the shape of a sub-slit region in at least one of the quadrants is a trapezoid shape;
    a first polarizer disposed under the first substrate;
    a second polarizer disposed above the second substrate, wherein a polarization axis of the second polarizer is vertical to that of the first polarizer; and
    a liquid crystal (LC) layer with chiral dopants disposed between the first and second substrates.

11. The liquid crystal display device as claimed in claim 10, wherein a parameter of the LC rotations (d/p ratio) of the LC layer with chiral dopants is between 0.2 and 0.3, and a parameter of the optical path difference (Δnd) of the LC layer with chiral dopants is between 330 nm and 550 nm, and wherein d is a thickness of the LC layer with chiral dopants, p is a pitch of the chiral dopants, and Δn is a birefringence coefficient of the LC layer with chiral dopants.

12. The liquid crystal display device as claimed in claim 10, wherein the sub-slit region has a repeatable arrangement by counterclockwise rotating the sub-slit region along an outer-paper direction of a normal line of a crossing point of the cross primary slit with a rotating period of multiples of 90 degrees.

13. The liquid crystal display device as claimed in claim 10, wherein the pixel electrode unit comprises a primary electrode region and a slit region;
the pixel unit has a first boundary along a horizontal direction of an upper portion of the pixel unit, and the first boundary has a first central point;
the primary electrode region has a first side, along the horizontal direction of an upper portion of the primary electrode region, and the first side has a second central point left to the first central point; and
the primary electrode region has a second side located left to the second central point, and a first angle between the first and second sides in the primary electrode region is larger than 90 degrees or equal to 90 degrees.

14. The liquid crystal display device as claimed in claim 13, wherein the pixel unit further comprises a second boundary along a vertical direction of a left portion of the pixel unit, and the second boundary has a third central point;
the primary electrode region has a third side along the vertical direction of a left portion of the primary electrode region, and the third side has a fourth central point below to the third central point; and
the primary electrode region has a fourth side located below to the third central point, and a second angle between the third and fourth sides in the primary electrode region is larger than 90 degrees or equal to 90 degrees.

15. The liquid crystal display device as claimed in claim 13, wherein the pixel unit further comprises a third boundary along the horizontal direction of a lower portion of the pixel unit, and the third boundary has a fifth central point;
the primary electrode region has a fifth side along the horizontal direction of a lower portion of the primary electrode region, and the fifth side has a sixth central point right to the fifth central point; and
the primary electrode region has a sixth side located right to the fifth central point, and a third angle between the fifth and sixth sides in the primary electrode region is larger than 90 degrees or equal to 90 degrees.

16. The liquid crystal display device as claimed in claim 13, wherein the pixel unit further comprises a fourth boundary along a vertical direction of a right portion of the pixel unit, and the fourth boundary has a seventh central point;
the primary electrode region has a seventh side along the vertical direction of a right portion of the primary electrode region, and the seventh side has an eighth central point up to the seventh central point; and
the primary electrode region has an eighth side located up to the seventh central point, and a fourth angle between the seventh and eighth sides in the primary electrode region is larger than 90 degrees or equal to 90 degrees.

17. The liquid crystal display device as claimed in claim 10, wherein the pixel electrode unit comprises a primary electrode region and a slit region;
the pixel unit has a first boundary along a horizontal direction of an upper portion of the pixel unit, and the first boundary has a first central point; and
the primary electrode region has a first side along the horizontal direction of an upper portion of the primary electrode region, the first side has a second central point, and the first central point and the second central point are both on a line along a vertical direction.

18. The liquid crystal display device as claimed in claim 17, wherein the pixel unit further comprises a second boundary along the vertical direction of a left portion of the pixel unit, and the second boundary has a third central point; and
the primary electrode region has a second side along the vertical direction of a left portion of the primary electrode region, the second side has a fourth central point, and the third central point and the fourth central point are both on a line along the horizontal direction.

19. The liquid crystal display device as claimed in claim 17, wherein the pixel unit further comprises a third boundary along the horizontal direction of a lower portion of the pixel unit, and the third boundary has a fifth central point; and
the primary electrode region has a third side along the horizontal direction of a lower portion of the primary electrode region, the third side has a sixth central point, and the fifth central point and the sixth central point are both on a line along the vertical direction.

20. The liquid crystal display device as claimed in claim 17, wherein the pixel unit further comprises a fourth boundary along a vertical direction of a right portion of the pixel unit, and the fourth boundary has a seventh central point; and
the primary electrode region has a fourth side along the vertical direction of a right portion of the primary electrode region, the fourth side has an eighth central point, and the seventh central point and the eighth central point are both on a line along the horizontal direction.

* * * * *